Figure 1:
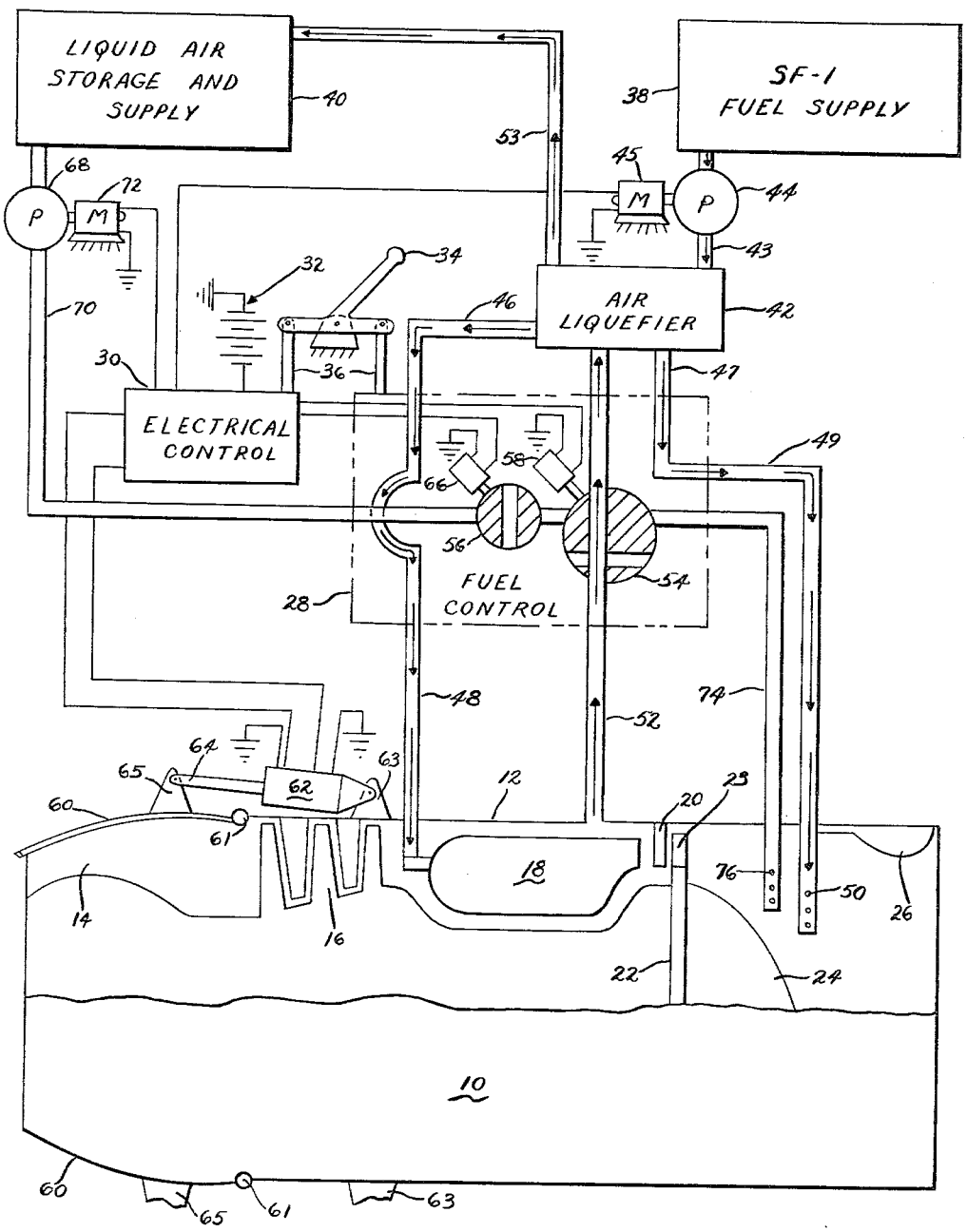

INVENTOR.
ADOLF J. CERVENKA

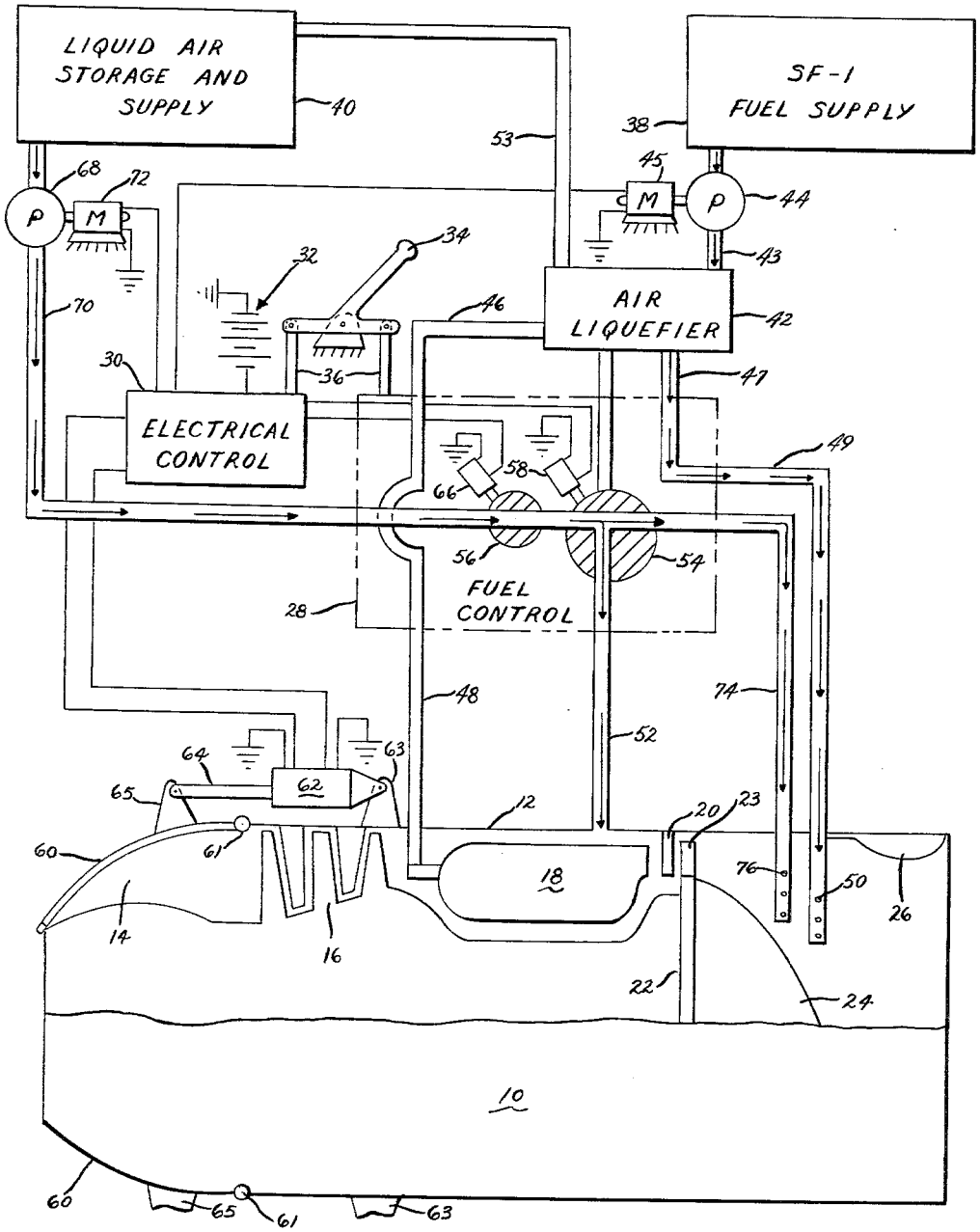

United States Patent Office

3,229,459
Patented Jan. 18, 1966

3,229,459
TURBOJET-LIQUID AIR ROCKET AND
FUEL SYSTEM
Adolph J. Cervenka, Severna Park, Md., assignor to the
United States of America as represented by the Secretary of the Air Force
Filed Nov. 26, 1963, Ser. No. 326,309
3 Claims. (Cl. 60—35.6)

This invention relates to power plants, operable in an efficient manner, both within and beyond the earth's atmosphere. More specifically, this invention relates to a hybrid power plant operable as an air breathing turbojet at low altitudes and as a rocket at high altitudes; together with a fuel system for fueling the power plant under both modes of operation.

There is a need for a hybrid power plant which can combine the advantages of air breathing engine operation in the atmosphere with rocket operation in the stratosphere. Such a power plant would be particularly useful for missions where extremes in flight speed and altitude are encountered, as for example: the first stage of a space vehicle operating from sea level to the fringes of the atmosphere and beyond; or, on a manned craft which is to return from the stratosphere to the atmosphere.

Since an air breathing engine such as a turbojet operates efficiently at low altitudes and flight speeds, and a rocket engine is efficient at the extreme altitudes and speeds, a hybrid engine combining the two into one power plant would make an ideal recoverable power plant of minimum weight.

The power plant of the present invention, at low altitudes, operates as a conventional turbojet equipped with an afterburner. When it is desired to shift from turbojet to rocket operation, the air inlet is closed and the afterburner becomes a rocket combustion chamber when supplied with liquid air and fuel.

SF–1 fuel is used for both modes of operation. Other fuels could be used; however, the manner in which air is liquefied during turbojet operation and stored for subsequent rocket operation, dictates an extremely low temperature fuel in order to have sufficient refrigration to liquefy the air.

One object of this invention is to combine into one power plant the operating functions of a turbojet engine and a rocket engine.

Another object of this invention is to provide a hybrid power plant which is efficient at both atmospheric and stratospheric operation.

A further object of the invention is to provide a power plant capable of providing the motive power for a space vehicle to take off from the earth's surface, fly into the stratosphere and then return for continued flight in the atmosphere.

Yet another object of this invention is to provide a hybrid power plant having a common combustion chamber for use on two modes of power plant operation.

A still further object of this invention is to provide a common fuel system for a hybrid power plant operable as either a turbojet or a rocket engine.

Another object of this invention is to provide a fuel system for a hybrid power plant in which, during turbojet operation, air is liquefied and stored for use as an oxidizing agent during subsequent rocket operation.

More objects of novelty and utility will be apparent from the following description and drawings in which like parts are designated by like numerals:

FIG. 1 is a schematic of the power plant and fuel system during turbojet operation, and FIG. 2 is a schematic of the power plant and fuel system during rocket engine operation.

Referring more specifically to FIG. 1, there is shown the power plant 10 having an outer structure 12, an air inlet 14, a compressor 16, one or more combustion cans 18, a plurality of turbine inlet guide vanes 20, a turbine wheel 22 coaxially joined to the compressor and having on the periphery thereof a plurality of turbine blades 23, an afterburner cone 24, and an afterburner nozzle 26. The primary control of the power plant is by means of a fuel control 28 and an electrical control 30. The electrical control 30 and the electrical components to be hereinafter named may be powered by any convenient electrical source such as a battery bank 32. Both the fuel control and the electrical control may be simultaneously positioned by means of pilot lever 34 acting through linkage 36.

Carried on board the space craft is a fuel supply storage 38 for supplying a common source of fuel, and a liquid air storage and supply 40. The fuel supply may consist of liquid SF–1 fuel which has a temperature of about 30° Rankine. This extremely low temperature is ideally suited for liquefying air in the air liquefier or heat exchanger 42 which functions in the customary manner.

The direction of flow in all conduit members is as indicated by the flow arrows. Fuel is pumped from the fuel supply storage 38 to the heat exchanger 42 through fuel conduit 43 by means of pump 44 driven by motor 45 and energized from the electrical control 30. The fuel leaves the heat exchanger through conduits 46 and 47 which join fuel conduit 43 within the heat exchanger (not shown) and enters the fuel control 28 from which it leaves through conduits 48 and 49 to enter the power plant; the fuel passing through conduit 48 entering the combustion cans 18, and the fuel passing through conduit 49 entering the afterburner section of the engine where it is ejected through a plurality of spray nozzles 50.

Electrical controls and fuel controls per se are well known to the art and do not constitute a portion of this invention. They are therefore shown only by phantom lines; and only so much is shown internally as is required to show the fuel and air flow valving during the two modes of operation, together with control means. It is customary, by fuel control means using various engine parameters, to control both the flow of fuel to the combustion cans and to the afterburner; this is well known and standard in the art, and has been omitted from the drawings.

While the power plant is being operated as a turbojet, a portion of the compressed air flowing through the power plant may be bled off by conduit 52 at any convenient point before combustion, and passed to the heat exchanger 42. The bleed air in flowing through the heat exchanger is liquefied by the extremely cold SF–1 fuel and is passed as liquid air into the liquid air storage and supply 40 through conduit 53. Contained within conduit 52 is a three-way valve 54 which, for convenience, is shown within the fuel control 28 as being an integral part of the fuel control system. This valve 54, together with the adjacent shut-off valve 56, which will be explained hereinafter, may be outside the fuel control proper, if so desired. The three-way valve 54 is shown as being actuated by a solenoid 58 and energized from the electrical control 30; however, other means, such as hydraulic may be employed, if desired. The quantity of air to be bled from the power plant and liquefied may be tailored to mission requirements. Ideally, sufficient air should be bled and liquefied to provide the required amount of oxidizer during the rocket phase of the flight. Suitable throttling and shut-off means (not shown) may be provided in conduit 52 to further regulate the bleed air.

The power plant inlet 14 is equipped with a plurality of inlet flaps 60, or other means for opening and closing the air inlet. Each inlet flap may be pivotally joined to the outer structure 12 by means of a hinge 61. The inlet flaps may be actuated to the open position shown on FIG. 1 and to the closed position shown on FIG. 2 by any convenient hydraulic or mechanical means, or by the double solenoid 62 which is energized from the electrical control 30. The double solenoid is shown having the rear end pivotally supported by bracket 63 joined to the outer structure 12. The operating plunger 64, extending from the double solenoid, pivotally engages bracket 65 joined to inlet flap 60.

Operation of the power plant in the rocket mode is shown on FIG. 2. The inlet flaps 60 are closed to cut off the air flow into the engine. The three-way valve 54 is actuated from the position shown on FIG. 1 to that shown on FIG. 2; and the shut-off valve 56 is opened. Valve 56 may be actuated by any convenient means such as a solenoid 66 which is energized from the electrical control 30.

As is done during turbojet operation, SF–1 fuel is pumped by pump 44 from the fuel supply 38, through air liquefier 42, through fuel control 28 and through conduit 49 from which it is ejected into the afterburner through spray nozzles 50. It is noted that during rocket mode operation, no fuel flows through conduits 46 and 48 to the combustion cans 18; the afterburner of the power plant being the rocket combustion chamber. Liquid air, which had been liquefied during turbojet operation and stored in the storage and supply tank 40, is pumped by pumps 68 to fuel control 28 through conduit 70. In like manner as pump 44, pump 68 may be driven by an electric motor 72 which is energized and controlled by electric control 30. The major portion of the liquid air flows from the fuel control through conduit 74 from which it is ejected through nozzles 76 to oxidize the SF–1 fuel being ejected from spray nozzles 50. The balance of the liquid air flows into the power plant through conduit 52 where it serves two useful purposes: (1) the gasifying air provides an effective barrier upstream from turbine 22 for protecting the internal elements from the intense heat of combustion, and (2) although there is seepage of air through the inlet flaps 60, sufficient pressure differential is maintained across the outer structure 12 to prevent engine collapse. It is obvious that the air passing through the turbine wheel into the afterburner will co-mingle with the air emitting from nozzles 76.

The power plant shown and described may be equipped with standard ignition and starting systems. Such systems are well known to the art and have been omitted for simplicity.

It is to be understood that the embodiments of the invention as shown and described are to be regarded as illustrative only and that the invention is susceptible to variations, modifications and changes within the scope of the appended claims.

I claim:

1. In combinaiton with a low temperature liquid fuel burning power plant, operable as both a turbojet and as a rocket, and comprising an air compressor, a gas turbine coaxially joined to the compressor, one or more combustion chambers in which a mixture of fuel and air from the compressor is burned to provide gases for driving the turbine during turbojet operation, an afterburner for burning fuel during turbojet operation and providing the rocket combustion chamber during rocket operation, a variable inlet means open during turbojet operation to admit air to the compressor and closed during rocket operation, a fuel control for controlling the fuel to the combustion chambers and afterburner, and means joined to and controlling the variable inlet; a fuel system for said power plant comprising: a liquid fuel supply, an air liquefier, fuel conduit means passing through said air liquefier and joining said fuel supply and said fuel control, pump means joined to said fuel conduit means for pumping the fuel from said liquid fuel supply to said power plant through said air liquefier and said fuel control, a liquid air storage and fuel supply, a first conduit means passing through said air liquefier and joining said liquid air storage and supply to said power plant for bleeding from said power plant during turbojet operation a portion of the air compressed by said compressor and storing in said liquid air storage and supply after liquefying in said air liquefier, a second conduit means joining said liquid air storage and supply to said power plant, pump means joined to said second conduit means for pumping the liquid air from said liquid air storage to said power plant during rocket operation, and control means joined to said first and said second conduit means for permitting the bleeding of air from said power plant during turbojet operation and the return of liquid air to said power plant during rocket operation.

2. In combination with a low temperature liquid fuel burning power plant, operable as both a turbojet and as a rocket, and comprising an air compressor, a gas turbine coaxially joined to the compressor, one or more combustion chambers in which a mixture of fuel and air from the compressor is burned to provide gases for driving the turbine during turbojet operation, an afterburner for burning fuel during turbojet operation and providing the rocket combustion chamber during rocket operation, a variable inlet means open during turbojet operation to admit air to the compressor and closed during rocket operation, a fuel control for controlling the fuel to the combustion chambers and afterburner, and means joined to and controlling the variable inlet; a fuel system for said power plant comprising: a liquid fuel supply, an air liquefier, fuel conduit means passing through said air liquefier and joining said fuel supply and said fuel control, pump means joined to said fuel conduit means for pumping the fuel from said liquid fuel supply to said power plant through said air liquefier and said fuel control, a liquid air storage and fuel supply, a first conduit means passing through said air liquefier and joining said liquid air storage and supply to said power plant for bleeding from said power plant during turbojet operation a portion of the air compressed by said compressor and storing in said liquid air storage and supply after liquefying in said air liquefier, a second conduit means joining said liquid air storage and supply to said power plant, pump means joined to said second conduit means for pumping the liquid air from said liquid air storage to said power plant during rocket operation, and a three-way valve joined to said first and said second conduit means for permitting the bleeding of air from said power plant during turbojet operation and the return of liquid air to said power plant during rocket operation.

3. A fuel system of the character set forth in claim 2 and further having: a shut-off valve in said second conduit means upstream from said three-way valve for preventing flow through said second conduit means during turbojet operation.

References Cited by the Examiner

UNITED STATES PATENTS

| | | | |
|---|---|---|---|
| 2,745,247 | 5/1956 | Singelmann et al. | 60—35.6 X |
| 3,038,408 | 6/1962 | Kluge | 60—35.6 X |
| 3,040,520 | 6/1962 | Rae | 60—39.46 X |

MARK NEWMAN, *Primary Examiner.*

D. HART, *Assistant Examiner.*